: US 6,439,330 B1
(45) Date of Patent: Aug. 27, 2002

(54) VEHICLE HOOD DEPLOYMENT DEVICE FOR PEDESTRIAN PROTECTION

(75) Inventor: Jerome Paye, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,983

(22) Filed: Nov. 5, 2001

(51) Int. Cl.⁷ .............................................. B62D 25/10
(52) U.S. Cl. ..................... 180/69.21; 180/274; 296/189
(58) Field of Search .................. 180/274, 69.1, 180/69.21, 281; 296/203.02, 189, 194

(56) References Cited

U.S. PATENT DOCUMENTS

| | | | |
|---|---|---|---|
| 4,015,870 A | | 4/1977 | Stcherbatcheff et al. |
| 4,093,290 A | * | 6/1978 | Pearson ........................ 293/15 |
| 4,249,632 A | | 2/1981 | Lucchini et al. |
| 5,339,494 A | * | 8/1994 | Esau et al. ..................... 16/233 |
| 5,385,212 A | | 1/1995 | Cady et al. |
| 5,557,829 A | * | 9/1996 | Schoen et al. ................. 16/371 |
| 5,697,467 A | | 12/1997 | Howard |
| 5,934,743 A | | 8/1999 | Nohr et al. |
| 6,182,782 B1 | * | 2/2001 | Matsuura et al. ........... 180/274 |
| 6,217,108 B1 | * | 4/2001 | Sasaki ........................ 180/274 |
| 6,237,992 B1 | * | 5/2001 | Howard ....................... 180/271 |
| 6,293,362 B1 | * | 9/2001 | Sasaki et al. ................. 180/274 |
| 6,330,734 B1 | * | 12/2001 | Cho ............................. 16/222 |

FOREIGN PATENT DOCUMENTS

| | | | | | |
|---|---|---|---|---|---|
| DK | 2711338 A | * | 3/1977 | ........... | B60R/21/14 |
| GB | WO9718108 | * | 5/1997 | ........... | B60R/21/34 |

* cited by examiner

*Primary Examiner*—Brian L. Johnson
*Assistant Examiner*—Kelly E Campbell
(74) *Attorney, Agent, or Firm*—Gary A. Smith

(57) ABSTRACT

A device for deploying the hood of an automotive vehicle upwardly in the event of impact with a pedestrian includes a hinge assembly secured to the vehicle structure below the trailing edge of the hood and a guide track extending forwardly. A hinge arm has a pivot end rotatably connected to the hood adjacent the trailing edge and a slide end engaging the track for movement therealong. A pyrotechnically powered actuator is mounted on the body structure in front of the hinge assembly and engages the hinge arm, the actuator having a retracted condition wherein the hinge arm is in the normal operating position and movable to an extended condition to urge the hinge arm to the raised position, the actuator acting along a line of action generally parallel with the track. During normal vehicle operations, the piston is retracted, the hinge arm slide end is adjacent the forward end of the track, and the pivot end is engaged with the retaining member permitting normal opening and closing of the hood. Upon a collision with a pedestrian, the actuator extends the piston, urging the hinge arm to a raised position wherein the slide end is adjacent the rear end of the track and the pivot end is raised upward, causing the trailing edge of the hood to move upwardly.

19 Claims, 3 Drawing Sheets

VEHICLE HOOD DEPLOYMENT DEVICE FOR PEDESTRIAN PROTECTION

BACKGROUND OF INVENTION

The present invention relates generally to a vehicle hood that is deployable upwardly in response to the vehicle impacting a pedestrian to provide additional crush space between the hood and underhood components.

In modern automotive design it is desirable for visibility, aerodynamic and styling reasons that the hood line be kept as low as possible. As a result, there is generally very little clearance between the hood and the engine bay contents of the automotive vehicle. As a result, the hood is unable to yield enough to provide significant cushioning when a pedestrian strikes the hood during an accident. Pedestrian safety performance can be improved by increasing the clearance between the hood and the vehicle components beneath the hood.

One way to achieve a greater clearance while maintaining a low hood line during normal vehicle operations is to provide a device to raise the hood in response to or immediately prior to the vehicle impacting a pedestrian.

Systems have been proposed for raising a vehicle hood using an actuating cylinder/piston with its line of action oriented vertically and acting on the hood to urge it upward when activated. Examples of such systems are disclosed in U.S. Pat. Nos. 6,217,108 and 6,182,782.

SUMMARY OF INVENTION

The present invention provides a pedestrian safety device for an automotive vehicle having a body structure with an upper surface and a hood with a trailing edge and a leading edge. The safety device comprises a hinge arm having a pivot end rotatably connected to the hood adjacent the trailing edge and a sliding end restrained for movement along a path generally parallel with the upper surface of the body structure. The hinge arm is movable between a normal operating position wherein the slide end is adjacent the forward end of the path and the pivot end is relatively close to the upper surface of the vehicle body structure, and a raised position wherein the slide end is adjacent the rear end of the path and the pivot end is raised with respect to the normal position, movement of the hinge arm from the normal position to the raised position causing the trailing edge of the hood to move upwardly. An actuator is disposed on the body structure and engages the hinge arm, acting along a line of action generally parallel with the path. The actuator has a retracted condition wherein the hinge arm is in the normal operating position and is movable to an extended condition to urge the hinge arm to the raised position. Movement of the hinge arm to the raised position results in the trailing edge of the hood being lifted upward, thus creating a greater amount of crush space between the hood and underhood components so that the hood may absorb more kinetic energy when struck by a pedestrian. The alignment of the actuator and path generally parallel with the upper surface of the vehicle structure permits the actuator to be mounted on or near the top of the body structure immediately beneath the hood, thus reducing the cost and complexity of installation and repair of the actuator.

According to another feature of the invention, the pedestrian safety device further comprises a pivot structure connecting the body structure with the hood adjacent the leading edge and providing a lateral axis about which the hood rotates relative to the body structure when the hinge arm moves to the raised position. The pivot structure preferably is part of a latch mechanism used to alternatively secure the hood closed and permit the hood to be opened during normal operation. The pivot structure also preferably enables the hood leading edge to translate rearward when the trailing edge of the hood moves upwardly. This rearward translation ensures that the hood leading edge does not impinge on other portions of the vehicle structure during deployment, such as the headlamp or grille.

According to another feature of the invention, the pivot end of the hinge arm is connected to the hood by a pivot mechanism about which the hood rotates for normal opening and closing of the hood when the hinge arm is in the normal operating position. The pivot end of the hinge arm is engaged by a retaining member disposed on the vehicle structure when in the normal operating position and is retained in a proper location for opening and closing of the hood. The retaining member preferably comprises a slot that has an open end facing upward to direct the pivot end to move upward when moving to the raised position and to prevent the hood trailing edge from being raised when the actuator is in the retracted condition. The invention device thus provides a simple, compact hinge mechanism that allows the hood to function normally prior to deployment of the hood.

According to another feature of the invention, the actuator pivotingly is connected to the body structure so that it may rotate as necessary to maintain an optimum alignment with the hinge arm during upward deployment of the hood.

Other features and advantages of the present invention will be readily appreciated and better understood after reading the subsequent description when considered in connection with the accompanying drawings.

DETAILED DESCRIPTION

Figure 1:
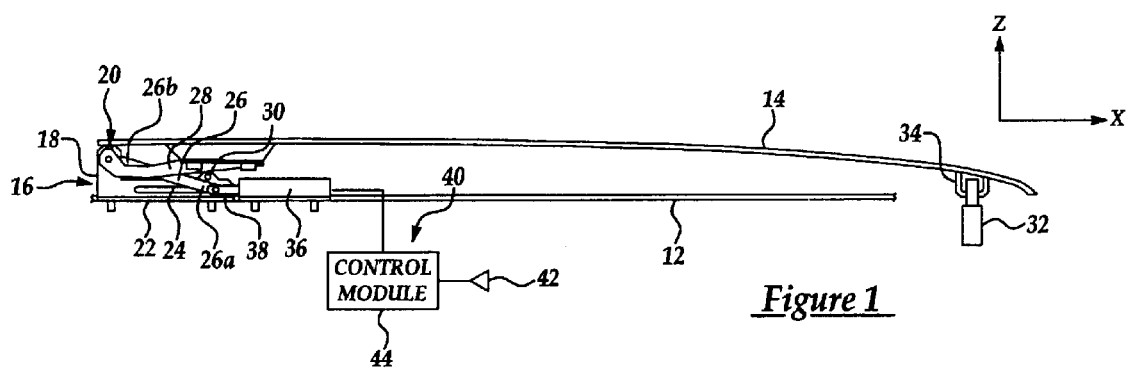
FIG. 1 is a side view of an embodiment of a hood deployment device according to the present invention in a normal operating condition.
Figure 2:
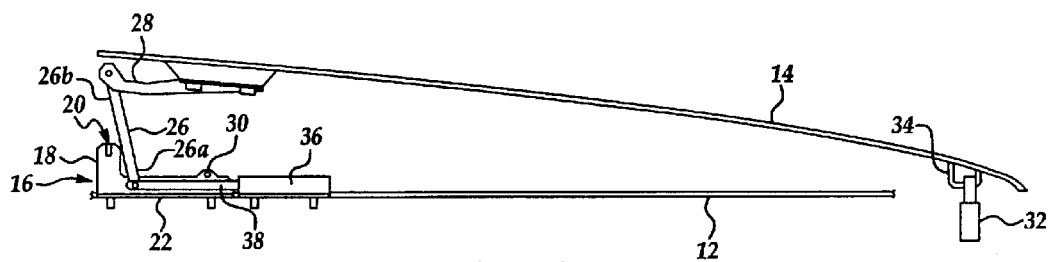
FIG. 2 is a side view of the hood deployment device of FIG. 1 in a raised or deployed condition.
Figure 3:
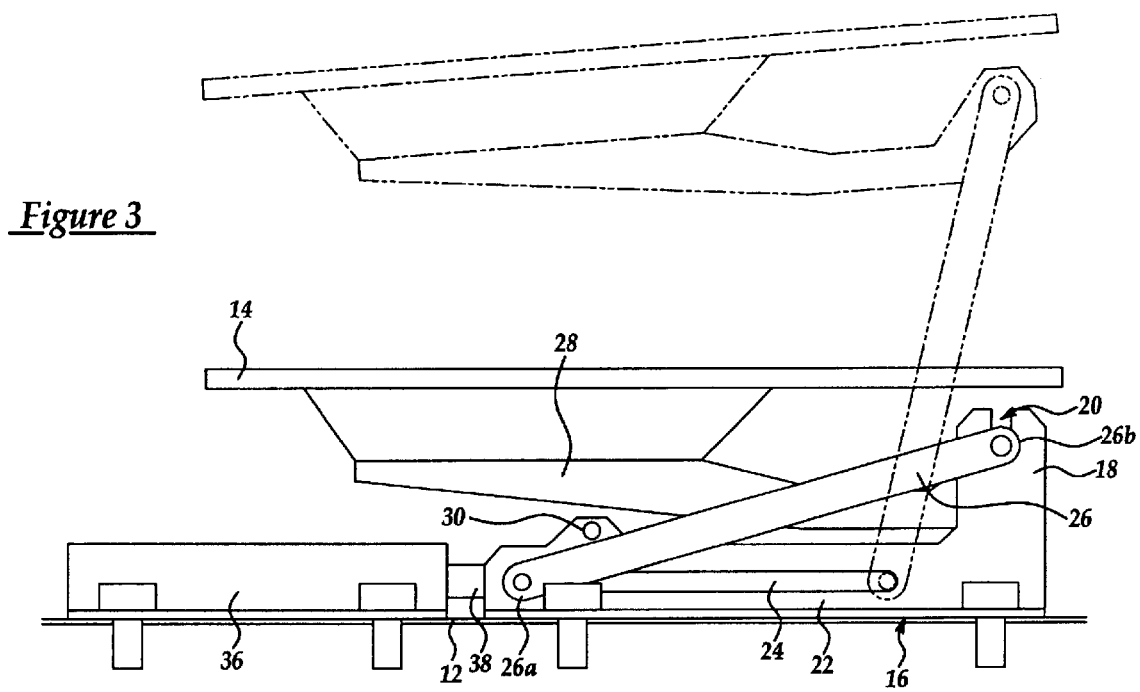
FIG. 3 is an enlarged view from the opposite side of the hood deployment device of FIG. 1.

Referring to FIGS. 1–3, an embodiment of a hood deployment device according to the present invention is shown in combination with a vehicle body structure, generally indicated at 12, and a hood 14. While the following description is directed to a vehicle having a hood that is hinged at a trailing edge, the invention may also be applied to a hood hinged at its leading edge. All references to directions herein are relative to the vehicle as a whole and use the convention shown by the coordinate axes indicated in FIG. 1, wherein the X-axis is the longitudinal axis of the vehicle, the Y-axis is the lateral axis, and the Z-axis is the vertical axis.

A vehicle will preferably have two substantially identical hood deployment devices, one adjacent each lateral edge of the hood. The following description applies to each of the devices.

A hinge assembly 16 is secured to the vehicle structure 12 adjacent its upper surface in the area of the vehicle body commonly known as the shotgun. Hinge assembly 16 includes a retaining member 18 disposed approximately below the trailing edge of hood 14 and having an upward-facing retaining slot 20. Hinge assembly 16 further includes a guide member 22 extending forward from the retaining member 18 along the X-axis of the vehicle and having a track 24 formed therein. Track 24 defines a path oriented generally parallel with the upper surface of the vehicle structure 12. The upper surface of vehicle structure 12 is depicted in FIGS. 1 and 2 as being generally horizontal, but may be inclined from horizontal and/or may be curved depending on the design of the particular vehicle.

A hinge arm 26 has a slide end 26a engaging the track 24 for sliding movement therealong. A pivot end 26b of hinge arm 26 rotatably engages a hood hinge 28 secured to hood 14 adjacent the trailing edge thereof. During normal vehicle operating conditions, as shown in FIG. 1, the slide end 26a of hinge arm 26 is disposed adjacent the forward end of the track 24 and the pivot end 26b is relatively close to the vehicle structure 12 and seated in retaining slot 20. In this normal condition, hood 14 and hood hinge 28 are free to rotate about hinge arm pivot end 26b in order to open and close the hood in a conventional fashion.

A lock pin 30 passes through hinge assembly 16 immediately above hinge arm 26 and contacts or is closely adjacent the upper of the hinge arm 26. Lock pin 30 blocks rotation of hinge arm 26 about its slide end 26a as long as the slide end remains adjacent the forward end of track 24. Accordingly, lock pin 30 prevents the trailing edge of hood 14 from being lifted upward so as to thwart attempts to steal, vandalize, or otherwise tamper with components in the engine compartment beneath the hood. Even in the absence of lock pin 30, engagement of hinge arm 26 with slot 20 prevents the trailing edge of the hood from being lifted by blocking the rotation of hinge arm 26 about its slide end 26a as long as the slide end remains adjacent the forward end of track 24.

A latch 32 is attached to vehicle structure 12 below the leading edge of hood 14, and a striker 34 is attached to the underside of hood 14 in a position to engage the latch 32 to secure the hood 14 in a closed position. Latch 32 may be manually and/or remote mechanically actuated to release striker 34 in order to permit the hood to be opened, as is well known in the art.

An actuator 36 is secured to vehicle structure 12 immediately forward of hinge assembly 16 and comprises a linearly movable piston 38, the distal end of which engages hinge arm 26. Actuator 36 is mounted to vehicle structure 12 so that the line of action of piston 38 is parallel with track 24. During normal vehicle operating conditions piston 38 is in a retracted condition (shown in FIG. 1).

Actuator 36 is preferably powered by a pyrotechnic charge, but any appropriate means (mechanical, electrical, hydraulic, magnetic, pneumatic, etc.) of driving a piston or other movable member may be used.

Actuator 36 is activated by a control system 40 indicated schematically at in FIG. 1. The control system 40 comprises a pedestrian impact sensor 42, which may detect physical impacts with the vehicle or may be a pre-impact detector utilizing, for example, radar, laser, sonar, optical, or any other appropriate remote detection means. A control module 44 receives signals from sensor 42, evaluates the signals, and activates actuator 36 when the signals indicate that the vehicle has struck or is about to strike a pedestrian.

When control system 40 detects an actual or impending impact with a pedestrian (not shown), actuator 36 is activated to move piston 38 from the retracted condition to the extended condition shown in FIG. 2, driving hinge arm 26 to the rear. The engagement between latch 32 and striker 34 restrains hood against rearward movement so that hinge arm 26 rotates about slide end 26a and pivot end 26b lifts upward, thereby moving hood 14 to the raised position.

As hinge arm 26 begins to move away from the normal operating position, the pivot end 26b is constrained by retaining slot 20 and so moves purely along the axis of the slot. Retaining slot 20 thus directs the initial movement of hood 14 upward, preventing rearward movement until the hood trailing edge has lifted upward a sufficient amount to avoid interference with other body panels to the rear of the hood.

In the raised position, hood 14 is spaced from vehicle components (not shown) in the engine compartment to provide space for the hood to deflect downward when struck by the pedestrian and so absorb kinetic energy of the impact. Additional cushioning may be provided by actuator 36, which may be designed to provide an energy-absorbing damper effect when in the deployed condition.

In the preferred embodiment shown, movement of hood 14 to the raised position results in a pivoting motion about a lateral axis adjacent the leading edge of the hood 14. The lateral pivot axis is provided by the interaction between latch 32 and striker 34, which together comprise a latch structure. Latch 32 and striker 34 are designed to permit a small amount of rearward movement of hood 14 during deployment after the pivot end 26b of hinge arm 26 has cleared retaining slot 20. As seen in FIG. 2, striker 34 is able to move rearward relative to latch 32 by an amount sufficient to allow the leading edge of the hood to move downward during deployment without interference with front end components such as grille, headlamps, front fascia, etc.

Figure 4:
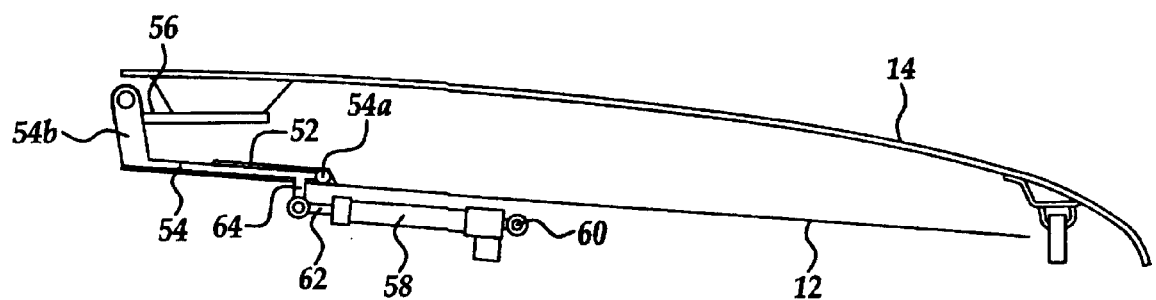
FIG. 4 is a side view of a second embodiment of a hood deployment device according to the present invention in a normal operating condition.

Referring now to FIGS. 3 and 4, a second embodiment of the invention is shown to comprise a track 52 disposed on the upper surface of vehicle structure 12 and a hinge arm 54 having a slide end 54a engaged with the track 52 and an opposite pivot end 54b engaged with a hood hinge 56 secured to hood 14. As in the first embodiment, hinge arm 54 is movable between a normal operating position wherein the end 54a is adjacent the forward end of track 52 and the pivot end 54b is relatively close to the vehicle structure 12, and a raised position wherein the slide end 54a is adjacent the rear end of track 52 and the pivot end 54b is raised with respect to the normal position to lift the trailing edge of the hood 14 upwardly.

In the second embodiment, a forward end of actuator 58 is attached to vehicle structure 12 at a pivot point 60 and piston 62 engages a stub 64 extending downward from hinge arm 54. As seen in FIG. 4, in the normal operating condition actuator 58 is in a generally horizontal orientation so that the line of action of piston 62 is parallel to but offset from track 52. Actuator 58 is preferably attached to the inboard side of the shotgun, thus freeing more package space between hood 14 and the upper surface of vehicle structure 12.

Figure 5:
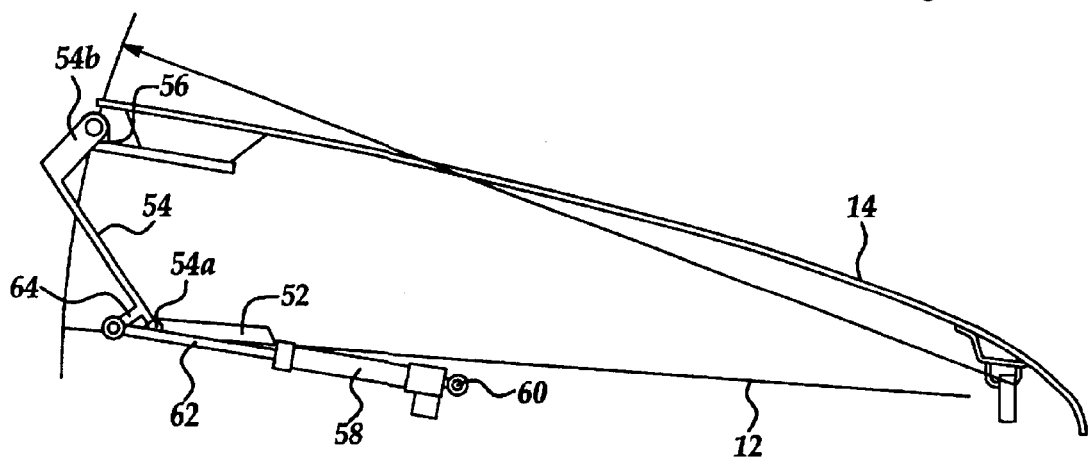
FIG. 5 is a side view of the hood deployment device of FIG. 4 in raised or deployed position.

When actuator 58 is activated by a control system, as described in relation to the first embodiment, piston 62 moves to an extended condition and urges hinge arm 54 to the raised position as shown in FIG. 5. As hinge arm 54 moves to the raised position, it rotates upwardly about its slide end 54a and the offset distance between track 52 and the line of action of piston 62 changes. This results in actuator 58 rotating about pivot point 60 as necessary.

In both disclosed embodiments of the invention, the actuator is mounted adjacent the upper surface of the vehicle structure in the vicinity of the shotgun and with the line of action of the piston generally parallel with the upper surface of the vehicle structure. This mounting improves the underhood packaging of the actuator and allows the actuator to be more easily installed and serviced than if installed in a vertical or upright position. In particular, hinge assembly 16 can be installed in the vehicle before the vehicle is painted and the actuator can be easily installed after the vehicle is painted so that actuator is not damaged by the painting process.

While the best modes for carrying out the invention have been described in detail, those familiar with the art to which this invention relates will recognize various alternative designs and embodiments for practicing the invention as defined by the appended claims.

What is claimed is:

1. A pedestrian safety device for an automotive vehicle having a body structure with an upper surface and a hood with a trailing edge and a leading edge, the safety device comprising:

a hinge arm having a pivot end rotatably connected to the hood adjacent the trailing edge and a slide end restrained for movement along a path generally parallel with the upper surface of the body structure and having a forward end and a rear end, the hinge arm movable between a normal operating position wherein the slide end is adjacent the forward end of the path and the pivot end is relatively close to the upper surface of the vehicle structure, and a raised position wherein the slide end is adjacent the rear end of the path and the pivot end is raised with respect to the normal position, movement of the hinge arm from the normal position to the raised position causing the trailing edge of the hood to move upwardly; and an actuator disposed on the body structure and engaging the hinge arm, the actuator having a retracted condition wherein the hinge arm is in the normal operating position and movable to an extended condition to urge the hinge arm to the raised position, the actuator having a line of action generally parallel with the path.

2. The apparatus according to claim 1 further comprising a guide member secured to the vehicle structure and defining the path, the slide end of the hinge arm engaged with the guide member for movement along the path.

3. The apparatus according to claim 1 further comprising a lock pin engaging the hinge arm when in the normal operating position to prevent the pivot end from moving upwardly when the slide end is adjacent the forward end of the path.

4. The apparatus according to claim 1 wherein the pivot end of the hinge arm is connected to the hood such that the hood is rotatable about the pivot end for opening and closing of the hood when the hinge arm is in the normal operating position.

5. The apparatus according to claim 4 further comprising a retaining member disposed on the vehicle structure, the retaining member engaging the pivot end of the hinge arm when in the normal operating position to retain the pivot end in a proper location for opening and closing of the hood.

6. The apparatus according to claim 5 wherein the retaining member comprises a slot that receives the pivot end of the hinge arm and has an open end facing upward.

7. The apparatus according to claim 1 wherein the actuator is connected to the body structure at a pivot point and rotates about the pivot point as the actuator moves to the extended condition.

8. The apparatus according to claim 1 further comprising a latch mechanism detachably connecting the body structure with the hood adjacent the leading edge to allow the hood to be alternatively secured closed and opened during normal operation of the hood, the latch mechanism operative to permit the hood to rotate about a lateral axis with respect to the body structure when the hinge arm moves to the raised position.

9. The apparatus according to claim 8 wherein the latch mechanism is further operative to enable the hood leading edge to translate rearward when the trailing edge of the hood moves upwardly.

10. A pedestrian safety device for an automotive vehicle having a body structure and a hood with a trailing edge and a leading edge, the safety device comprising:

a guide member disposed on the body structure adjacent the hood trailing edge and defining a path having a forward end and a rear end;

a hinge arm having a pivot end rotatably connected to the hood adjacent the trailing edge and a slide end engaging the guide member for movement along the path, the hinge arm movable between a normal operating position wherein the slide end is adjacent the forward end of the path and the pivot end is relatively close to the vehicle structure, and a raised position wherein the slide end is adjacent the rear end of the path and the pivot end is raised with respect to the normal position, movement of the hinge arm from the normal position to the raised position causing the trailing edge of the hood to move upwardly; and an actuator disposed on the body structure and engaging the hinge arm, the actuator having a retracted condition wherein the hinge arm is in the normal operating position and movable to an extended condition to urge the hinge arm to the raised position, the actuator acting along a line of action generally parallel with the path.

11. The apparatus according to claim 10 further comprising a lock pin engaging the hinge arm when in the normal operating position to prevent the pivot end from moving upwardly when the slide end is at the forward end of the path.

12. The apparatus according to claim 10 wherein the pivot end of the hinge arm is connected to the hood such that the hood is rotatable about the pivot end for opening and closing of the hood when the hinge arm is in the normal operating position.

13. The apparatus according to claim 12 further comprising a retaining member disposed on the vehicle structure, the retaining member engaging the pivot end of the hinge arm when in the normal operating position to retain the pivot end in a proper location for opening and closing of the hood.

14. The apparatus according to claim 13 wherein the retaining member comprises a slot that receives the pivot end of the hinge arm and has an open end facing upward.

15. The apparatus according to claim 10 wherein the actuator is connected to the body structure at a pivot point and rotates about the pivot point as the actuator moves to the extended condition.

16. A pedestrian safety device for an automotive vehicle having a body structure and a hood with a trailing edge and a leading edge, the safety device comprising:

a hinge assembly secured to the vehicle structure and comprising a retaining member disposed approximately below the trailing edge of hood and having an upward-facing retaining slot, and a guide member extending forwardly from the retaining member and having a track formed therein generally parallel with the upper surface of the vehicle structure;

a hinge arm having a pivot end rotatably connected to the hood adjacent the trailing edge and a slide end engaging the track for movement therealong, the hinge arm movable between a normal operating position wherein the slide end is adjacent the forward end of the track and the pivot end is engaged with the retaining member for normal opening and closing of the hood, and a raised position wherein the slide end is adjacent the rear end of the track and the pivot end is raised with respect to the normal position, movement of the hinge arm from the normal position to the raised position causing the trailing edge of the hood to move upwardly; and an actuator disposed on the body structure and engaging the hinge arm, the actuator having a retracted condition wherein the hinge arm is in the normal operating position and movable to an extended condition to urge the hinge arm to the raised position, the actuator acting along a line of action generally parallel with the track.

17. The apparatus according to claim 16 wherein the retaining member comprises a slot that receives the pivot end of the hinge arm and has an open end facing upward.

18. The apparatus according to claim 16 wherein the actuator is connected to the body structure at a pivot point and rotates about the pivot point as the actuator moves to the extended condition.

19. The apparatus according to claim 16 further comprising a latch mechanism detachably connecting the body structure with the hood adjacent the leading edge to allow the hood to be alternatively secured closed and opened during normal operation of the hood, the latch mechanism defining a lateral axis about which the hood rotates when the hinge arm moves to the raised position and enabling the hood leading edge to translate rearward when the trailing edge of the hood moves upwardly.

* * * * *